United States Patent
Heuberger et al.

(10) Patent No.: US 10,641,339 B2
(45) Date of Patent: May 5, 2020

(54) SECURING ELEMENT FOR A BEARING ELEMENT

(71) Applicant: Valeo Systèmes d'Essuyage, Le Mesnil Saint Denis (FR)

(72) Inventors: Christof Heuberger, Bietigheim-Bissingen (DE); Siegfried Stefani, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/230,062

(22) Filed: Dec. 21, 2018

(65) Prior Publication Data
US 2019/0211878 A1    Jul. 11, 2019

(30) Foreign Application Priority Data

Jan. 5, 2018   (DE) .................. 10 2018 100 164

(51) Int. Cl.
| | | |
|---|---|---|
| *F16C 35/067* | (2006.01) | |
| *F16C 35/06* | (2006.01) | |
| *F16C 19/06* | (2006.01) | |
| *F16C 23/06* | (2006.01) | |
| *F16C 35/063* | (2006.01) | |
| *F16C 25/06* | (2006.01) | |
| *F16C 27/04* | (2006.01) | |
| *F16B 43/00* | (2006.01) | |

(Continued)

(52) U.S. Cl.
CPC ............ *F16C 35/06* (2013.01); *F16B 43/005* (2013.01); *F16C 19/06* (2013.01); *F16C 23/06* (2013.01); *F16C 25/06* (2013.01); *F16C 27/04* (2013.01); *F16C 35/063* (2013.01); *F16C 35/067* (2013.01); *F16B 21/183* (2013.01);

*F16C 2229/00* (2013.01); *F16C 2326/09* (2013.01); *F16C 2380/26* (2013.01); *F16F 1/025* (2013.01)

(58) Field of Classification Search
CPC ...... F16C 19/06; F16C 35/063; F16C 35/067; F16C 2326/09
See application file for complete search history.

(56) References Cited

U.S. PATENT DOCUMENTS

| 2,405,476 A | | 8/1946 | Weatherhead, Jr. | |
|---|---|---|---|---|
| 5,127,764 A | * | 7/1992 | Baer ..................... | F16B 21/186 403/316 |
| 5,971,621 A | * | 10/1999 | Oyafuso ................. | B60S 1/166 384/539 |

FOREIGN PATENT DOCUMENTS

| DE | | 4125491 A1 | * | 2/1993 | ............ | B21H 5/005 |
|---|---|---|---|---|---|---|
| DE | 10 2010 029 309 A1 | | | 12/2011 | | |
| EP | | 2148414 A2 | * | 1/2010 | ............. | F16C 35/04 |

OTHER PUBLICATIONS

Search Report in corresponding German Application No. 102018100164.9, dated Aug. 20, 2018 (10 pages).

* cited by examiner

*Primary Examiner* — Phillip A Johnson
(74) *Attorney, Agent, or Firm* — Osha Liang LLP

(57) ABSTRACT

The invention relates to a securing element (1; 1*a*) for a bearing device (50) in a housing (20) of a drive device (10), wherein the plate-like securing element (1; 1*a*) has two side legs (34, 35) and a base leg (36) which connects the side legs (34, 35), wherein, between the base leg (36) and the side legs (34, 35), there is formed a cutout (38) for receiving a shaft (12) which is mounted rotatably in a bearing (15), wherein the two side legs (34, 35) are designed to interact, by means (Continued)

Figure 3:
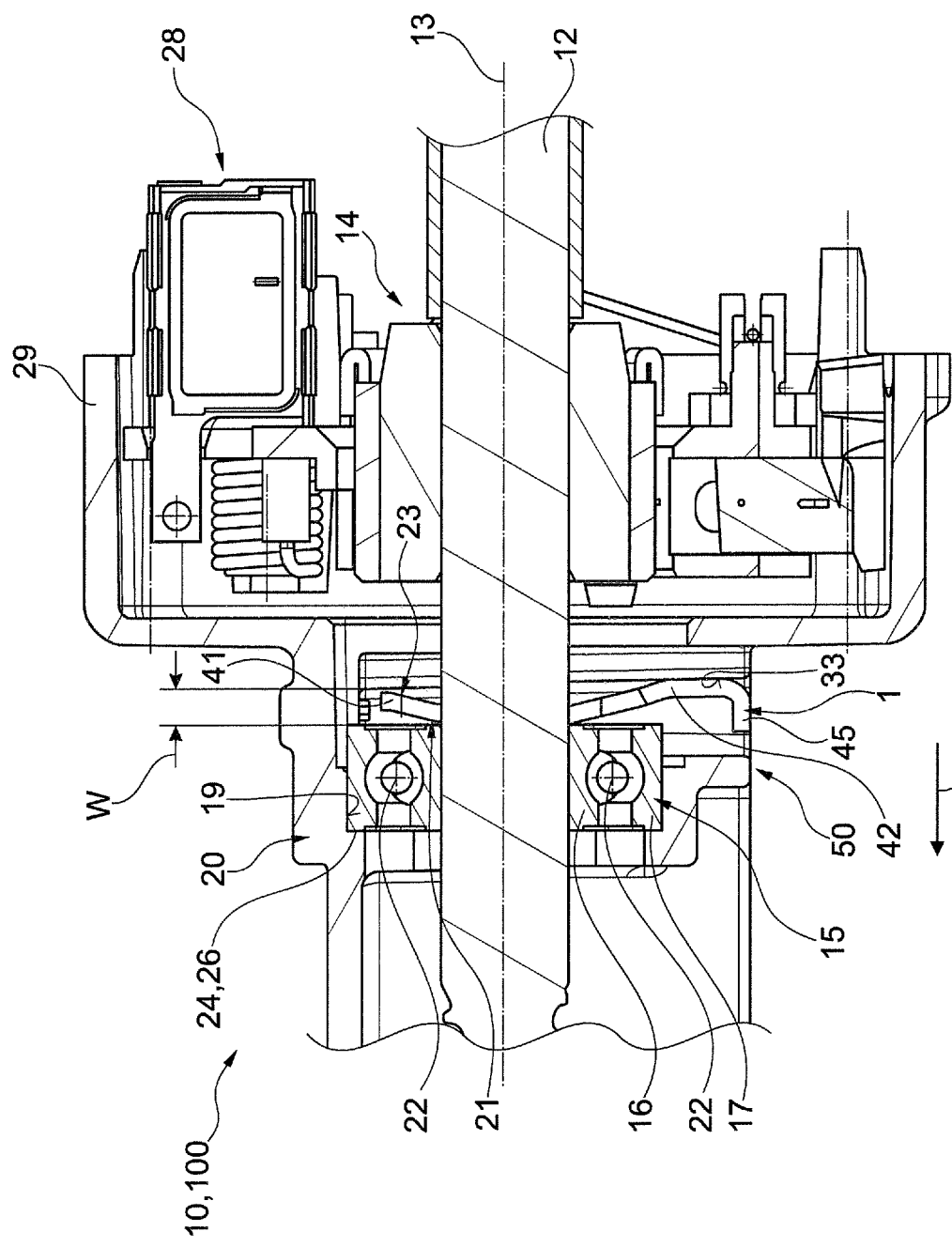

of a first face side (21), with the bearing (15) and, by means of a second face side (23), with a stop surface (33) in the housing (20).

10 Claims, 2 Drawing Sheets

(51) Int. Cl.
*F16B 21/18* (2006.01)
*F16F 1/02* (2006.01)

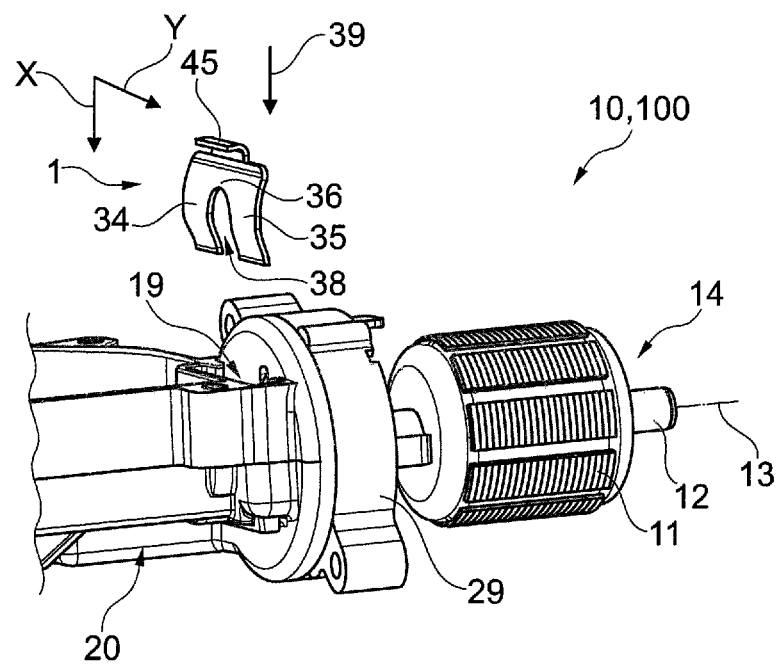
Fig. 1
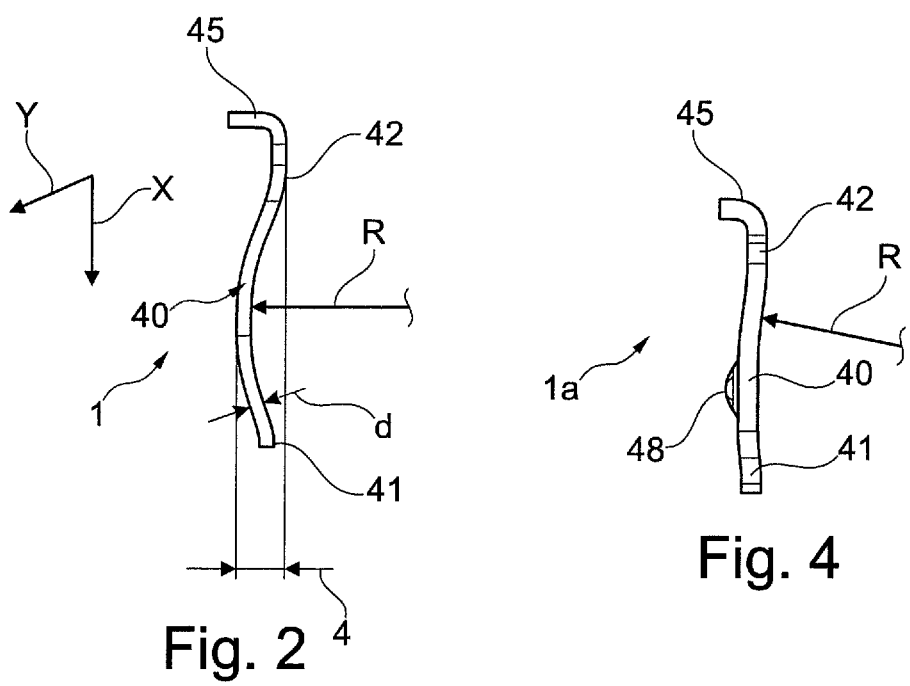
Fig. 2
Fig. 4

SECURING ELEMENT FOR A BEARING ELEMENT

PRIOR ART

The invention relates to a securing element for a bearing device in a housing of a drive device, to a bearing device, and to a windscreen wiper motor having a bearing device.

A securing element for a bearing device in a housing of a drive device having the features of the preamble of claim 1 is already known from practice. The substantially flat securing element, which is U-shaped in plan view, is in this case arranged in a receptacle of a housing of the drive device such that one face side of said securing element is arranged so as to be regionally in abutting contact with a bearing which serves for the rotatable mounting of a shaft, whereas the other face side of the securing element is regionally supported against an abutment surface of the receptacle. The known securing element serves for fixing the bearing in the receptacle and for compensating component tolerances or preventing axial play between the components. For this purpose, it is necessary for the securing element to be braced, or arranged with a clamping fit, between the abutment surface of the receptacle and the face side of the bearing. To ensure this, the known securing element has elevations which are formed by means of a stamping process and which are arranged in the region of the two side legs and on a face side. The elevations, which are of dome-shaped form, make it possible, as the securing element is slid into the receptacle, for the securing element to be received in the receptacle with the abovementioned clamping connection being formed. A disadvantage here is that the securing element can be received with clamping action in the receptacle only if the axial gap in the receptacle between the abutment surface and that face surface of the bearing which faces toward the securing element has relatively narrow tolerances. Furthermore, depending on component tolerances, relatively high installation forces are required for the insertion of the securing element in the axial direction.

DISCLOSURE OF THE INVENTION

The securing element according to the invention for a bearing device in a housing of a drive device having the features of claim 1 has the advantage that it permits a greater range of tolerances with regard to the dimensioning of the receptacle in the housing of the drive device, and, at the same time, the forces required for installing the securing element in the receptacle of the drive device are reduced. These advantages are achieved according to the invention in that the securing element is at least regionally bent in an axis running perpendicular to the two directions of the plane of the securing element, and has a bulge. As a result of the bending of the securing element in an axis or direction running perpendicular to the plane of the securing element, said securing element can be elastically deformed as it is inserted into the receptacle between the stop surface of the receptacle and that face surface of the bearing which faces toward the securing element, wherein the deformation forces required for this purpose or the installation forces are relatively low. Furthermore, as a result of the elastic deformation, a relatively large tolerance for the size of the receptacle for the securing element in the housing is made possible, because, in the case of an axial gap of decreasing size in the receptacle, the bulge of the securing element is reduced to an ever greater degree during the installation until, in the extreme case, said securing element no longer has a bulge in the installed state. The dimension for the size of the receptacle for the securing element is thus determined by the dimension by which the securing element is bulged in the non-installed state. Furthermore, the form of such a bulge on the securing element can be produced very easily in terms of production by means of a bending process, such that, by contrast to the prior art, it is for example the case that no stamping steps or no plastic deformation of the material of the securing element (elevations) is necessary.

Advantageous refinements of the securing element according to the invention for a bearing device in a housing of a drive device are specified in the subclaims. The invention encompasses all combinations of at least two of the features disclosed in the claims, in the description and/or in the figures.

Arrangement or embodiment of the bulge of the securing element in the region of the side legs is particularly preferred in which the at least one axis, perpendicularly to which the securing element is bent, is the direction of the longitudinal extent of the side legs. This is realized against the background that the side legs normally have a greater length in terms of their longitudinal extent than the base leg. Furthermore, in this way, points of abutting contact between the securing element and the bearing and the stop surfaces in the housing are made possible on opposite sides of the shaft.

It is however alternatively also conceivable for the at least one axis about which the securing element is of bulged form to run perpendicular to the direction of the longitudinal extent of the base leg.

A uniform deformation of the securing element during the insertion into the receptacle of the housing is achieved if the bulge is formed by a radius. Furthermore, by means of such a radius, linearly increasing installation forces during the insertion of the securing element into the receptacle of the bearing device are also achieved, which can thus be monitored and evaluated in a particularly effective manner in terms of process technology.

In order that the securing element can be in abutting contact over the greatest possible area in the region of the receptacle, in order to thus reduce the contact pressure and thus the material loading of the housing, which is composed in particular of aluminium, it is advantageous if the securing element has planar portions at peripheral elements outside the bulge.

Provision may furthermore be made whereby the securing element, in the direction of the axis in which said securing element does not have a bulge, has an installation and stiffening portion which projects at 90 degrees from the plane of the securing element. Said portion has the effect firstly that a deformation of the securing element takes place only in the bulged region, and that, secondly, the portion can be used particularly effectively for enabling the securing element to be gripped by means of a tool, for example an installation robot, and inserted into the receptacle of the housing.

Provision may additionally be made whereby, correspondingly to the prior art, the securing element, at a first face side and in the region of the two side legs, has in each case one elevation, formed preferably by means of a stamping process, for abutment against the bearing.

In order to limit the required installation forces, for reasons relating to functionality, provision is furthermore made for the element to be composed of spring steel and to have a thickness of between 0.8 mm and 1.2 mm, preferably of 1.0 mm.

The invention also encompasses a bearing device in a housing of a drive device, having a receptacle for a bearing for the rotatable mounting of a shaft and having a securing element designed according to the invention in the manner described above, wherein the receptacle forms a stop surface on a side of the securing element situated opposite the bearing, and wherein the receptacle has, between the bearing and the stop surface, an axial gap with a width which corresponds at most to the structural height of the securing element in the region of the bulge and at least to the thickness of the material of the securing element. Finally, the invention also encompasses a windscreen wiper motor having a bearing device of said type.

Further advantages, features and details of the invention will emerge from the following description of preferred exemplary embodiments and on the basis of the drawing.

In the drawing:

FIG. 1 shows parts of an armature and of a housing of a windscreen wiper motor and a securing element in a perspective illustration, FIG. 2 shows the securing element as per FIG. 1 in a side view, FIG. 3 shows the components as per FIG. 1 in the installed state in a longitudinal section, and FIG. 4 shows a securing element modified in relation to FIG. 2, likewise in a side view.

Identical elements or elements of identical function are denoted in the figures by the same reference designations.

FIGS. 1 and 3 illustrate individual constituent parts of a windscreen wiper motor 100. The windscreen wiper motor 100 has a drive device 10, which comprises inter alia an armature 14 with an armature lamination assembly 11 and armature windings (not illustrated). The armature lamination assembly 11 is fastened rotationally conjointly to a shaft 12 of the armature 14, wherein the shaft 12 is mounted rotatably about an axis of rotation 13. The mounting of the shaft 12 is performed by means of multiple bearing bodies or bearings 15, which are a constituent part of a bearing device 50, wherein one of the bearings 15 is illustrated in the form of a rolling bearing or ball bearing in FIG. 3.

The bearing 15 comprises an inner ring 16, which is fastened rotationally conjointly to the outer circumference of the shaft 12, for example by shrink-fitting. Furthermore, the bearing 15 comprises an outer ring 17, which is received, with the formation of an interference fit, in a receptacle 19 of the bearing device 50 of a housing 20, composed preferably of aluminium, of the windscreen wiper motor 100. Bearing bodies 22 are arranged, at uniform angular intervals about the axis of rotation 13, between the inner ring 16 and the outer ring 17.

Correspondingly to the illustration of FIG. 3, one face surface 24 of the bearing 15 bears axially against a step 26 of the receptacle 19. Also visible in FIG. 3 is a commutator device 28 of the drive device 10, which commutator device is received in a pot-shaped or cup-shaped housing portion 29.

To force the shaft 12 together with the armature lamination assembly 11 in the direction of the step 26, that is to say in the direction of the arrow 31 in FIG. 3 or of the axis of rotation 13, in order to compensate component tolerances and axial play, and to simultaneously fix the bearing 15 in the receptacle 19, use is made of a securing element 1 according to the invention of the bearing device 50, which securing element is, in the receptacle 19, correspondingly to the illustration of FIG. 3, supported by means of its two face surfaces 21, 23 axially between the inner ring 16 of the bearing 15 and a stop surface 33, running perpendicular to the direction of the arrow 31 or to the plane of the drawing of FIG. 3, of the receptacle 19.

The plate-like securing element 1 which can be seen particularly clearly in FIGS. 1 and 2 is composed of spring steel and preferably has a thickness d of between 0.8 mm and 1.2 mm, preferably of 1.0 mm. Said securing element is of U-shaped form in plan view with two side legs 34, 35 and a base leg 36 which connects the two side legs 34, 35 to one another. Formed between the side legs 34, 35 is a cutout 38 which is designed to receive the shaft 12 with play.

Correspondingly to the illustration of FIG. 1, the securing element 1 is introduced into the receptacle 19 of the housing 20 in the direction of the arrow 39 (perpendicular to the axis of rotation 13), wherein said securing element elastically deforms. It is essential here that, correspondingly to the illustration of FIG. 2, the securing element 1 is designed to be regionally bent in a direction running perpendicular to the two axes X, Y running in the plane of the securing element 1 (see FIG. 1). In the illustration of FIG. 2, the Y axis runs perpendicular to the plane of the drawing of FIG. 2. In the exemplary embodiment illustrated in FIGS. 1 to 3, the securing element 1 is designed to be regionally bent in the extent direction or along the two side legs 34, 35, and has, in an approximately central region in relation to the axial extent of the two side legs 34, 35, a bulge 40 which is formed by a radius R. The bulge 40 is formed uniformly on both face sides of the securing element 1, that is to say the material thickness of the securing element 1 is at least substantially equal in the region of the two side legs 34, 35. On both sides of the bulge 40, the securing element 1 has portions 41, 42 of planar form, which in the installed state of the securing element 1 in the receptacle 19 preferably bear flat against the abutment surface 33 of the receptacle 19 (FIG. 3). Furthermore, the securing element 1, in the region of the base leg 36, has an installation and stiffening portion 45 which is bent through 90 degrees and which serves for example for the handling of the securing element 1 during the insertion into the receptacle 19.

During the insertion or sliding of the securing element 1 into the receptacle 19 between the face surface 26, facing toward it, of the bearing 15 and the stop surface 33, the securing element 1 is elastically deformed in the region, in particular, of the bulge 40, such that the latter acts with an axial force on the shaft 12 in the direction of the step 26 or of the axis of rotation 13. For this purpose, it is essential that the securing element 1 has a structural height h perpendicular to the plane of the securing element 1 which is at least somewhat greater than the width w of the receptacle 19 between the bearing 15 and the stop surface 33. Furthermore, the width w of the receptacle 19 must be at least as large as the thickness d of the securing element 1.

The securing element 1a illustrated in FIG. 4 differs from the securing element 1 in that, on the side facing toward the installation and stiffening portion 45 and in the region of the bulge 40, an elevation 48 is additionally formed on each side leg 34, 35, which elevation is preferably formed by means of a stamping process. The elevation 48 serves for punctiform abutment against the inner ring 16 of the bearing 15.

The securing element 1, 1a thus described may be altered or modified in a variety of ways without departing from the concept of the invention.

LIST OF REFERENCE DESIGNATIONS 1, 1a Securing element
10 Drive device
11 Armature lamination assembly
12 Shaft
13 Axis of rotation 14 Armature
15 Bearing
16 Inner ring
17 Outer ring
19 Receptacle
20 Housing
21 Face side
22 Bearing body
23 Face side
24 Face surface
26 Step
28 Commutator device
29 Housing portion
31 Arrow
33 Stop surface
34 Side leg
35 Side leg
35 Base leg
36 Cutout
38 Arrow
40 Bulge
41 Portion
42 Portion
45 Stiffening portion
48 Elevation
50 Bearing device
100 Windscreen wiper motor
d Thickness
R Radius
h Structural height
w Width
X, Y Axis

The invention claimed is:

1. A securing element for a bearing device in a housing of a drive device, comprising:
   two side legs; and
   a base leg which connects the two side legs,
   wherein, between the base leg and the two side legs, there is formed a cutout for receiving a shaft which is mounted rotatably in a bearing,
   wherein the two side legs are configured to interact, by a first face side, with the bearing and, by a second face side, with a stop surface in the housing, and
   wherein the securing element is at least regionally bent in a direction arranged perpendicular to two axes running in a plane of the securing element, and has a bulge in the bent region.

2. The securing element according to claim 1, wherein at least one of the two axes runs in the direction of a longitudinal extent of the side legs.

3. The securing element according to claim 1, wherein at least one of the two axes runs in the direction of a longitudinal extent of the base leg.

4. The securing element according to claim 1, wherein the bulge is formed by a radius.

5. The securing element according to claim 1, wherein the securing element has planar portions at peripheral regions outside the bulge.

6. The securing element according to claim 1, wherein the securing element, in the direction of the axis in which said securing element does not have a bulge, has a stiffening portion which projects at 90 degrees from the plane of the securing element.

7. The securing element according to claim 1, wherein the securing element, at the first face side and in the region of the two side legs, has in each case one elevation, formed by a stamping process, for abutment against the bearing.

8. The securing element according to claim 1, wherein the securing element is composed of spring steel and has a thickness of between 0.8 mm and 1.2 mm.

9. A bearing device in a housing of a drive device, having a receptacle for a bearing for the rotatable mounting of a shaft and having a securing element as claimed in claim 1, wherein the receptacle forms a stop surface on a side of the securing element situated opposite the bearing, and wherein the receptacle has, between the bearing and the stop surface, a width which corresponds at most to the structural height of the securing element in the region of the bulge and at least to the thickness of the material of the securing element.

10. A windscreen wiper motor having a bearing device according to claim 9.

* * * * *